United States Patent
Ballard

[11] Patent Number: 5,330,283
[45] Date of Patent: Jul. 19, 1994

[54] BICYCLE SEAT CONNECTOR MEMBER

[76] Inventor: Thomas B. Ballard, 25550 Mulberry Dr., Southfield, Mich. 48034

[21] Appl. No.: 28,179

[22] Filed: Mar. 9, 1993

[51] Int. Cl.⁵ ............................................. B62J 1/00
[52] U.S. Cl. ...................................... 403/97; 403/87; 297/195.1; 297/201; 248/231.4; 248/316.4
[58] Field of Search ............... 403/97, 87; 297/215.15, 297/215.14, 195.1, 201; 248/230, 231.4, 316.4

[56]  References Cited
U.S. PATENT DOCUMENTS

| 229,670 | 7/1880 | Carrick. | |
|---|---|---|---|
| 585,858 | 7/1897 | Wooster | 403/97 |
| 4,108,462 | 8/1978 | Martin | 280/289 E |
| 4,877,286 | 10/1989 | Hobson et al. | 297/201 X |

Primary Examiner—Randolph A. Reese
Assistant Examiner—Christopher J. Novosad
Attorney, Agent, or Firm—Krass & Young

[57] ABSTRACT

A connector assembly for connecting a bicycle seat to a bicycle seat post. The assembly includes a housing defining a hollow opening downwardly to allow the upper end of the bicycle seat post to be passed upwardly into the hollow; a generally horizontal bore in the housing opening in the opposite side faces of the housing and sized to pass a fastener to facilitate fastening of the connector member to the frame of the bicycle seat; a circumferential array of serrations on each of the opposite side faces of the housing concentric with the bore for coaction with circumferentially arrayed serrations on the bicycle seat frame to allow adjustment of the angular position of the seat relative to the seat post upon loosening of the fastener; a vertical clamping surface defined in the housing in confronting relation to the hollow; and a clamping jaw slidably mounted in the hollow of the housing and having a vertical clamping surface coacting with the housing clamping surface to clamp the bicycle post therebetween. The clamping jaw is moved slidably in the hollow of the housing by a set screw passing through the rear wall of the housing and engaging the rear face of the clamping jaw. This arrangement allows the connector assembly to accommodate a wide variety of sizes of bicycle seat posts.

10 Claims, 3 Drawing Sheets

1

BICYCLE SEAT CONNECTOR MEMBER

BACKGROUND OF THE INVENTION

This invention is directed to a connector member for a bicycle seat and more specifically to a connector member for a bicycle seat which allows the associated seat to be universally mounted on a wide variety of seat post sizes.

Bicycle seats are typically mounted on the bicycle post by a U-shaped connector member including a bight portion which wraps clampingly around the upper end of the seat post, apertures in the free ends of each leg portion of the clamp, and a circumferential array of serrations concentric with each aperture. The frame of the associated seat also includes apertures and circumferential arrays of serrations centered on the apertures and a fastener passes through the apertures in the seat frame and in the connector member to clamp the bight portion of the connector member around the seat post in the desired angular position of the seat relative to the seat post. When it is desired to adjust the angular position of the seat relative to the seat post, the fastener is loosened to disengage the coacting serrations, the seat is moved to the adjusted angular position, and the fastener member is tightened.

While this arrangement is in wide use and is generally satisfactory, it has the disadvantage that a particular connector member is usable only with a particular size seat post so that a bicycle seat equipped with a particular connector member may be mounted only on a particular size seat post, thereby limiting the ability of the seat to be used universally with the various sizes of seat posts encountered in various types and sizes of bicycles.

SUMMARY OF THE INVENTION

This invention is directed to the provision of a connnector member for a bicycle seat which allows the seat to be mounted on virtually any size bicycle seat post.

The invention connector member is of the type adapted to clamp on a bicycle seat post and including circumferentially arrayed serrations on opposite side faces of the member adapted to coact with circumferentially arrayed serrations on the frame of the bicycle seat to adjustably mount the bicycle seat on the connector member with a fastener passing through aligned apertures in the centers of the circumferential arrays of serrations on the connector member and on the seat frame to allow the serrations to be disengaged upon loosening of the fastener to adjust the angular position of the seat relative to the post.

According to the invention, the connector member includes first and second clamping jaws which are movable slidably together to clamp the connector member to the seat post. This arrangement allows the connector member to be utilized with a wide variety of seat post sizes.

According to a further feature of the invention, the connector member includes a housing defining the serrations and further defining the first clamping jaw, and the second clamping jaw is slidably mounted on the housing. This arrangement provides a simple and effective means of clampingly accommodating a wide variety of seat post sizes.

According to a further feature of the invention, the housing is hollow, the upper end of the seat post passes upwardly into the hollow of the housing, and the housing includes a top wall against which the upper end of the seat post bottoms. This arrangement allows the connector member to be positively positioned on the upper end of the seat post.

According to a further feature of the invention, the second jaw is mounted for sliding movement in the hollow of the housing in a direction generally normal to the axis of the fastener. This arrangement facilitates the effective operation and compact packaging of the invention connector member.

According to a further feature of the invention, an opening is provided in the top wall of the housing to visually ensure that the upper end of the seat post has bottomed against the top wall.

DETAILED DESCRIPTION OF THE PREFERRED EMBODIMENT

Figure 1:
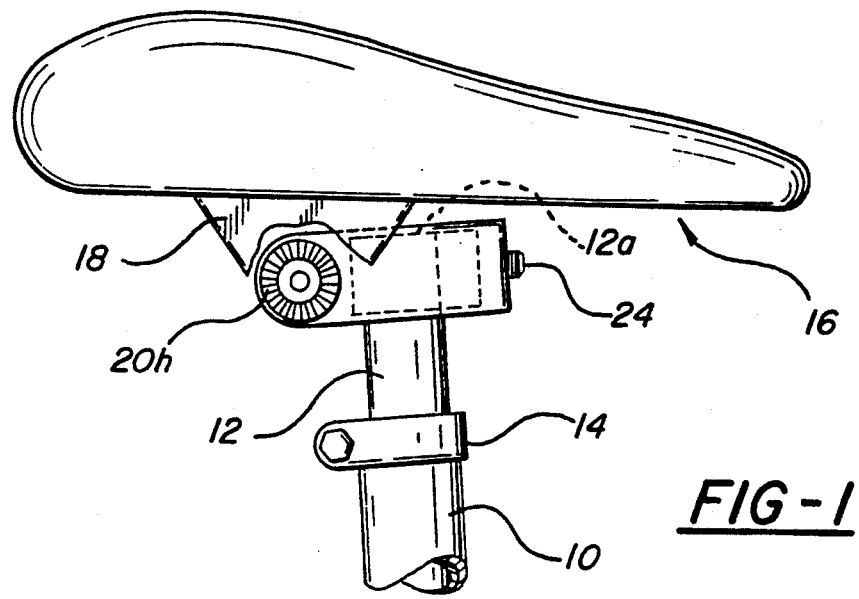
FIG. 1 is a fragmentary view of a bicycle seat mounted on a bicycle seat post utilizing a connector member assembly according to the invention.
Figure 2:
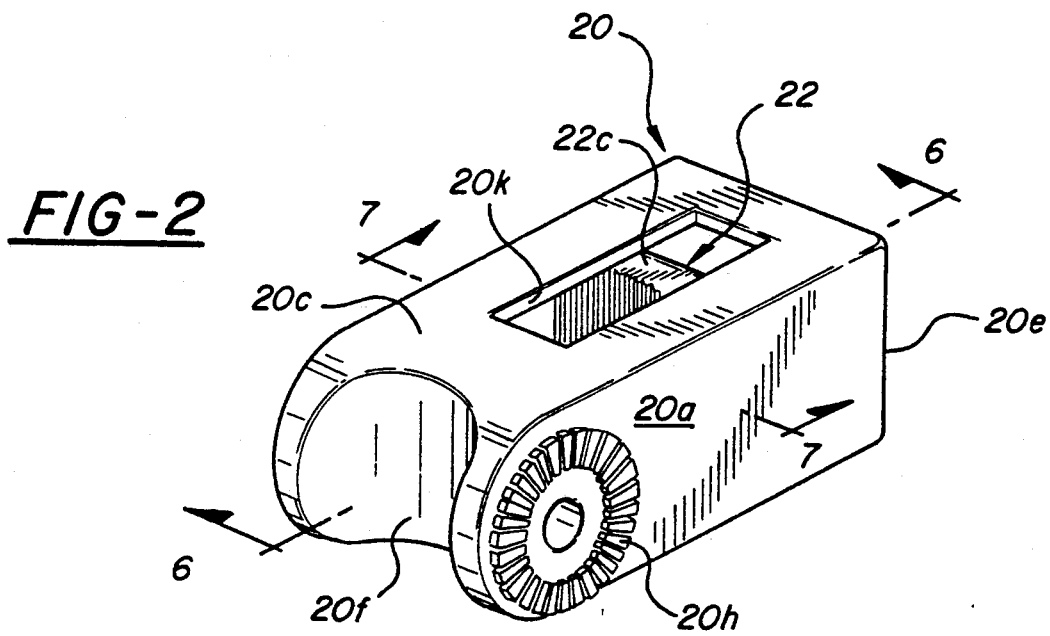
FIG. 2 is a perspective view of the invention connector member assembly.
Figure 3:
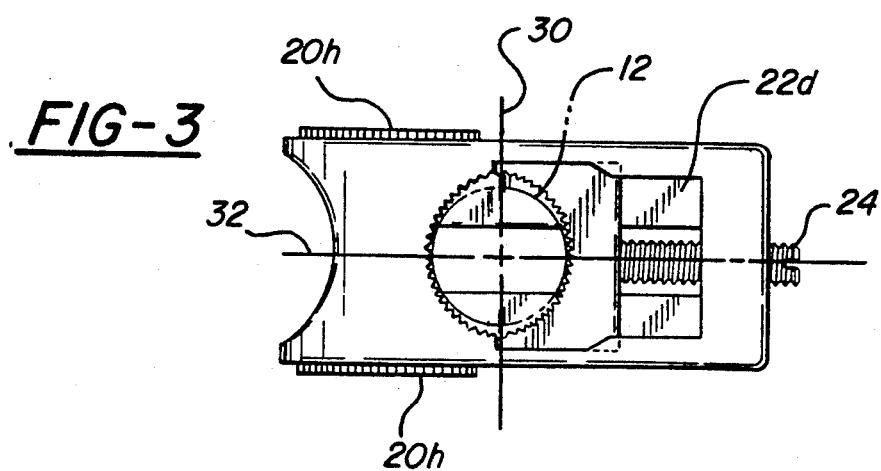
FIGS. 3 and 4 are bottom views of the connector member assembly.

The invention connector member assembly is utilized in association with a bicycle having a frame 10, a seat post 12 telescopically received in the frame 10 and adjusted by a clamping device 14, and a seat 16 having frame members 18.

The invention connector member assembly includes a housing 20, a clamping jaw 22, and a set screw 24.

Housing 20 has a generally rectangular configuration and is formed as a metal casting. Housing 20 includes side walls 20a and 20b, a top wall 20c, a bottom wall 20d, a front end wall 20e, and a rear end wall 20f. Housing 20 further defines a transverse bore 20g opening in side walls 20a and 20b proximate the rear end of the housing. A circumferential array of serration 20h is formed on side wall 20a in concentric relation to bore 20g and a further circumferential array of serrations 20h is formed on side wall 20b in concentric relation to bore 20g. Housing 20 further defines a hollow 20i opening downwardly at an opening 20j formed in the bottom wall of the housing. A slot 20k in the top wall 20c communicates with the upper end of hollow 20i. Housing 20 further defines a vertical clamping surface 20l confronting hollow 20i and forming a vertical border of the hollow. Clamping surface 20l is formed of a plurality of vertical teeth or serrations and has a generally arcuate configuration. Specifically, surface 20l, while arcuate, is not circular but rather has a generally oval configuration. Housing 20 further defines a threaded bore 20m passing through the front wall 20e of the housing and opening in the hollow 20i.

Clamping jaw 22 is also formed as a cast metal part and includes side surfaces 22a, a bottom surface 22b, a top surface 22c, a front surface 22d, and a rear vertical clamping surface 22e. Clamping surface 22e corresponds generally to clamping surface 20l and includes a plurality of vertical serrations. Surface 22e has a generally arcuate, oval configuration comprising a mirror image of the arcuate oval configuration of clamping surface 20l. Clamping jaw 22 further defines flat vertical edges 22f at the juncture of clamping surface 22e with each side surface 22a. Clamping jaw 22 has a size and configuration so as to fit slidably in housing hollow 20i and, specifically, has a height slightly less than the vertical height X of hollow 20i and a width slightly less than the width Y of hollow 20i.

Set screw 24 is of known form and is threadably received in threaded bore 24 in the front wall 20e of housing 20.

In the assembled relation of the connector member assembly, clamping jaw 22 is slidably mounted in hollow 20i and set screw 24 is threadably engaged in threaded bore 20m in the end wall of the housing with its rearward end 24a engaging the front surface 22d of the clamping jaw so that advancing movement of set screw 24 moves the clamping jaw slidably within the hollow of the housing toward clamping surface 20l so as to coact with the clamping surface to clamp the upper end of seat post 12 therebetween with the upper end 20a of the seat post bottomed against the lower face 20p of the top wall 20c of the housing.

Note that the upper face 22c of the jaw guides slidably on the under face 20p of the housing top wall and the lower face 20b of the jaw guides slidably on the upper face 20q of ledges 20r forming a part of lower housing wall 20c and defining a portion of opening 20j. Note further that the opening 20j includes a rearward portion 20s having a width slightly exceeding the width of the clamping jaw so that the clamping jaw may be positioned within the hollow of the housing by passing the clamping jaw upwardly through the opening portion 20s and then sliding the clamping jaw forwardly to slidably engage the lower surface 22b of the clamping jaw with the upper surface 20q of the ledges 20r.

It will be understood that circumferential arrays of serrations 18a formed on the frame portions 18 of the bicycle seat coact with the circumferential arrays of serrations 20h on the housing 20 to lockingly secure the seat in any desired position of angular adjustment relative to the connector member and thereby relative to the seat post with a bolt fastener 26 passing through apertures 18a in the seat frame portions 18 and through bore 20g for threaded coaction with a nut 28 to clampingly maintain the seat in the desired angular position. The seat is thus normally held in its position of angular adjustment relative to the connector member by the fastener 26 and nut 28 in coaction with the interengagement of the circumferential arrays of serrations on the seat frame and on the housing, and the seat may be moved to a new position of angular adjustment by loosening the fastener 26, angularly adjusting the seat, and retightening the fastener 26.

The invention connector member will be seen to allow connection of the associated bicycle seat to a wide variety of seat post sizes. Specifically, seat posts for standard sizes and types of bicycles normally range between ⅞ inch diameter and 1 ⅛ inch diameter and the invention connector member assembly is able to accommodate all seat post sizes within this range.

Figure 4:
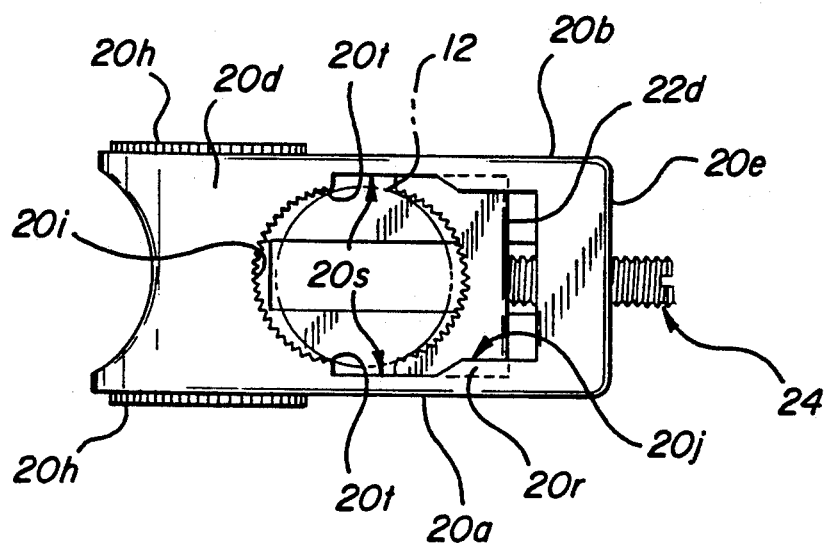
Figure 5:
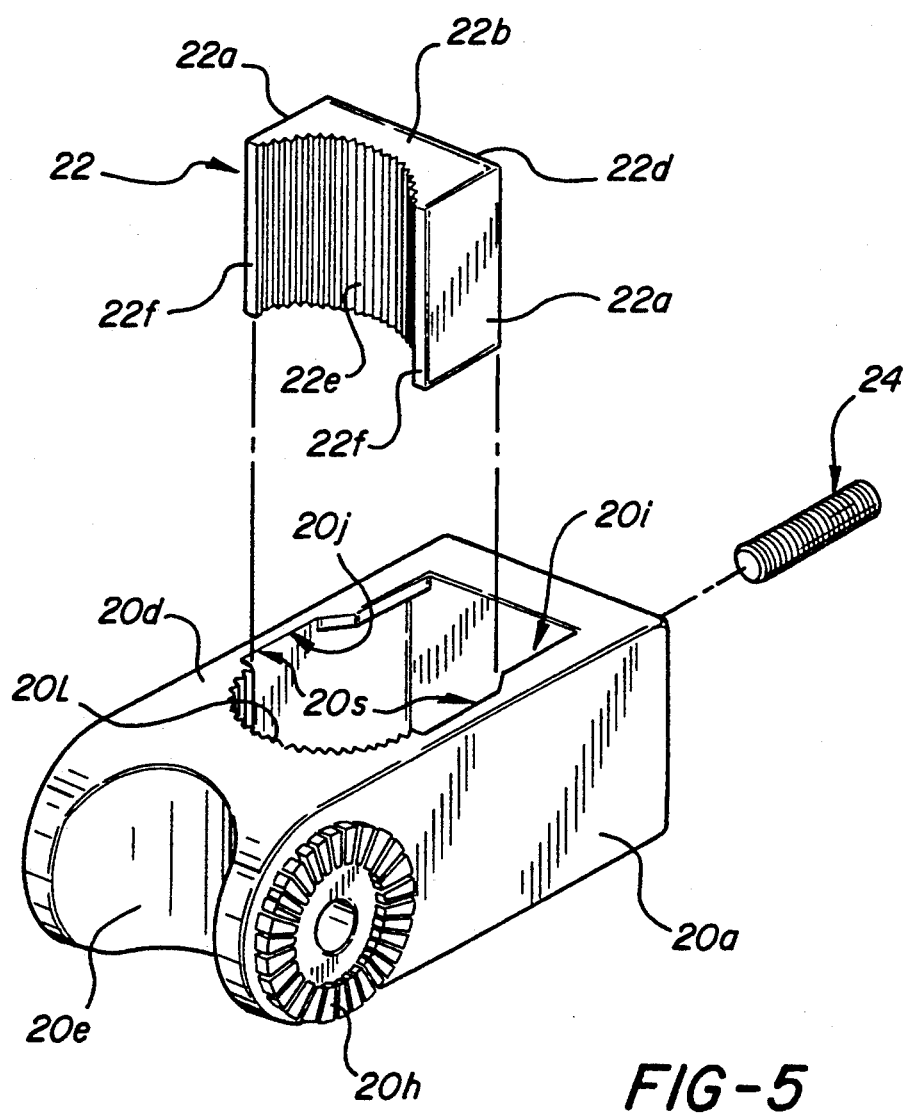
FIG. 5 is an exploded bottom perspective view of the connector member assembly.
Figure 6:
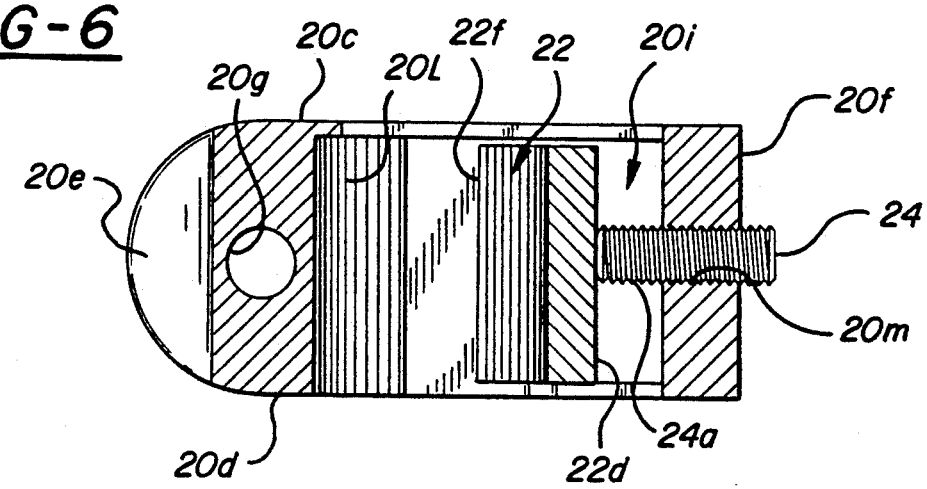
FIGS. 6 and 7 are cross sectional views taken on line 6—6 and 7—7 of FIG. 2.
Figure 7:
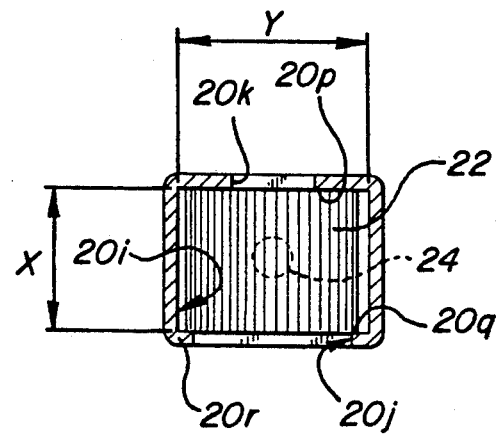
Figure 8:
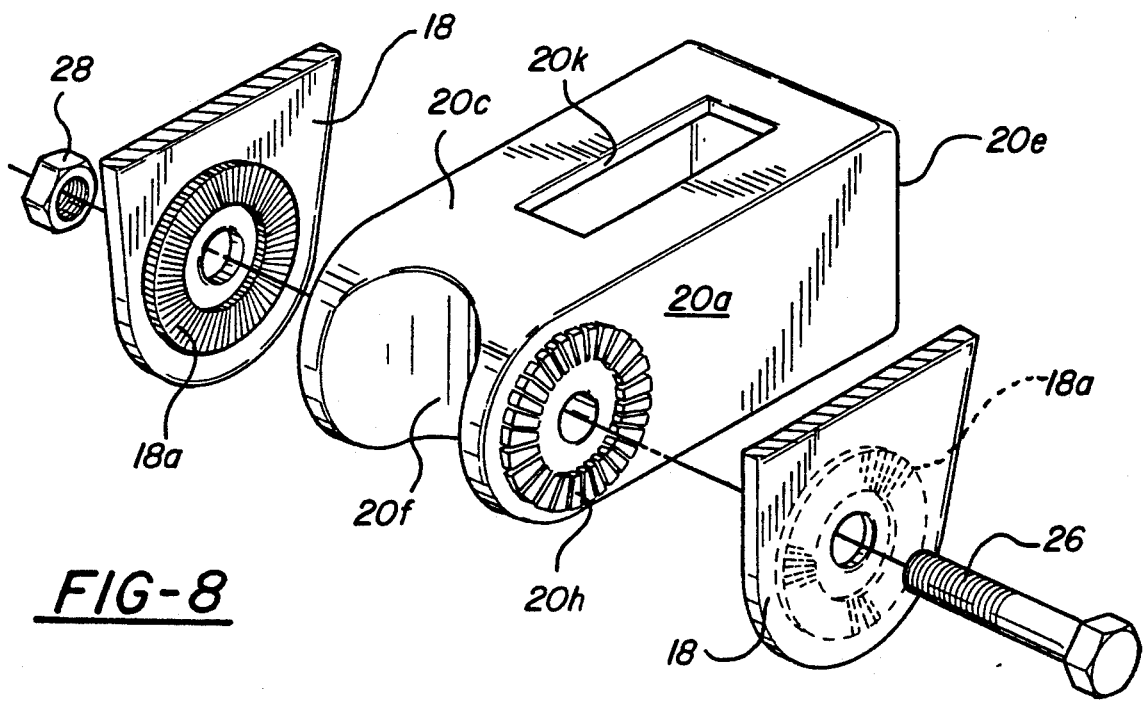
FIG. 8 is an exploded perspective view showing the manner in which the connector member assembly is connected to the associated bicycle seat.

Specifically, as seen in FIG. 4, with the clamping jaw 22 moved to a relatively forward or retracted position relative to the clamping surface 20l, a seat post 12 of the maximum 1 ⅛ inch diameter may be clampingly positioned between the clamping surface 20l and the clamping jaw 22 with the clamping engagement of the post being provided and maintained by tightening of screw 24 and, as seen in FIG. 5, a seat post having a minimum diameter of ⅞ inch may be clampingly secured between the clamping surface 20l and the clamping jaw 22 by moving the clamping jaw rearwardly to a position in which the vertical edges 22f of the clamping jaw are adjacent to vertical shoulder surfaces 20t provided on the housing proximate each end of clamping surface 20l. The oval configuration of clamping surface 20l and clamping surface 22e allow the clamping surfaces to firmly clamp both a relatively large and a relatively small seat post with the clamping engagement of the larger seat post occurring proximate the transverse centerline 30 of the connector assembly and the clamping engagement of the smaller post occurring proximate the longitudinal centerline 32 of the connector assembly.

The invention connector assembly will be seen to provide a simple and inexpensive connector mechanism that allows the associated seat to be utilized as the seat device for a wide variety of bicycle types and sizes irrespective of the size of the seat post.

Whereas a preferred embodiment of the invention has been illustrated and described in detail it will be obvious that various changes may be made in the disclosed embodiment without departing from the scope or spirit of the invention.

I claim:

1. A bicycle seat connector member adapted to clamp on a bicycle seat post and including circumferentially arrayed serrations on opposite side faces of the member adapted to coact with circumferentially arrayed serrations on a frame of a bicycle seat to adjustably mount the bicycle seat on the connector member with a fastener passing through aligned apertures in the centers of the circumferential arrays of serrations on the member and on the seat frame to allow the serrations to be disengaged upon loosening of the fastener to adjust the angular position of the seat relative to the post characterized in that:

the connector member includes first and second clamping jaws which are movable slidably together to clamp the connector member to the seat post.

2. A connector member according to claim 1 wherein:

the connector member includes a housing defining the circumferentially arrayed connector member serrations and the first clamping jaw, and the second clamping jaw is slidably mounted on the housing.

3. A connector member according to claim 2 wherein:

the housing is hollow, an upper end of the seat post passes upwardly into the hollow of the housing, and the housing includes a top wall against which the upper end of the seat post bottoms.

4. A connector member according to claim 3 wherein:

an opening is provided in the top wall of the housing to visually ensure that the upper end of the seat post has bottomed against the top wall of the housing.

5. A connector member according to claim 2 wherein:

the second jaw is mounted for sliding movement in a hollow of the housing in a direction generally normal to an axis of the fastener.

6. A connector member for a bicycle seat comprising:

a housing defining a hollow opening downwardly to allow an upper end of a bicycle seat post to be passed upwardly into the hollow;

a generally horizontal bore in the housing opening in opposite side faces of the housing and sized to pass a fastener to facilitate fastening of the connector member to a frame of a bicycle seat;

a circumferential array of serrations on each of said opposite side faces concentric with said bore for coaction with circumferentially arrayed serrations on the bicycle seat frame to allow adjustment of the angular position of the seat relative to the post upon loosening of the fastener;

a vertical clamping surface defined on said housing in confronting relation to the hollow; and a clamping jaw slidably mounted in the hollow of the housing and having a vertical clamping surface coacting with the housing clamping surface to clamp the bicycle post therebetween.

7. A connector member according to claim 6 wherein the housing further includes a top wall overlying the hollow so that the upper end of the seat post may be bottomed against the top wall to define the connected relationship of the connector member and the seat post.

8. The connector member according to claim 7 wherein:

an opening is provided in the top wall of the housing to visually ensure that the upper end of the seat post has bottomed against the top wall.

9. The connector member according to claim 6 wherein the clamping jaw is mounted for sliding movement in the housing in a direction generally normal to an axis of said bore.

10. A connector member according to claim 6 wherein each of the clamping surfaces has an oval configuration.

* * * * *